US011935364B2

(12) United States Patent
Yi et al.

(10) Patent No.: US 11,935,364 B2
(45) Date of Patent: *Mar. 19, 2024

(54) METHOD AND SYSTEM FOR PLAYER GROUP SHARING AND REDISTRIBUTING GAMING AWARDS

(71) Applicant: IGT, Las Vegas, NV (US)

(72) Inventors: Fei Yi, Beijing (CN); Wei Gong, Beijing (CN)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,152

(22) Filed: Oct. 13, 2022

(65) Prior Publication Data

US 2023/0033823 A1 Feb. 2, 2023

Related U.S. Application Data

(63) Continuation of application No. 17/479,235, filed on Sep. 20, 2021, now Pat. No. 11,514,756, which is a continuation of application No. 16/280,127, filed on Feb. 20, 2019, now Pat. No. 11,158,169.

(51) Int. Cl.
*G07F 17/32* (2006.01)

(52) U.S. Cl.
CPC ...... *G07F 17/3272* (2013.01); *G07F 17/3253* (2013.01); *G07F 17/3274* (2013.01); *G07F 17/3281* (2013.01); *G07F 17/3225* (2013.01)

(58) Field of Classification Search
CPC ............. G07F 17/3225; G07F 17/3253; G07F 17/3272; G07F 17/3274; G07F 17/3281
See application file for complete search history.

(56) References Cited

U.S. PATENT DOCUMENTS

| | | | | |
|---|---|---|---|---|
| 6,869,361 B2 | 3/2005 | Sharpless et al. | | |
| 8,047,909 B2 * | 11/2011 | Walker | G07F 17/3281 | 463/19 |
| 8,475,276 B2 * | 7/2013 | Byng | G07F 17/3244 | 463/42 |
| 8,777,735 B1 * | 7/2014 | Fine | G07F 17/3227 | 463/25 |
| 9,579,569 B2 | 2/2017 | Knutson | | |
| 11,158,169 B2 * | 10/2021 | Yi | G07F 17/3274 | |

(Continued)

OTHER PUBLICATIONS

"Bitcoin Mining, Explained," Investopedia, updated Feb. 10, 2019, 10 pages [retrieved online from: web.archive.org/web/20190307074333/https://www.investopedia.com/terms/b/bitcoin-mining.asp].

(Continued)

*Primary Examiner* — William H McCulloch, Jr.
(74) *Attorney, Agent, or Firm* — Sheridan Ross P.C.

(57) ABSTRACT

An electronic gaming system is capable of forming a multi-player group to play a game; receiving, from a first gaming device, first game play information for a first game played by a first player member of the multi-player group on the first gaming device; determining that the first game play information comprises a first winning outcome corresponding to a first winning outcome; in response, allocating the first winning outcome among the first and second player members; and notifying a second gaming device of the second player member that the second player member has received the second portion of the first winning outcome.

20 Claims, 10 Drawing Sheets

(56) References Cited

U.S. PATENT DOCUMENTS

| | | | |
|---|---|---|---|
| 11,514,756 | B2 * | 11/2022 | Yi ...................... G07F 17/3281 |
| 2002/0043759 | A1 | 4/2002 | Vancura |
| 2002/0045474 | A1 | 4/2002 | Singer et al. |
| 2003/0064807 | A1 | 4/2003 | Walker et al. |
| 2003/0224852 | A1 | 12/2003 | Walker et al. |
| 2004/0048646 | A1 | 3/2004 | Visocnik |
| 2006/0211479 | A1 | 9/2006 | Walker et al. |
| 2006/0240887 | A1 | 10/2006 | Walker et al. |
| 2006/0240889 | A1 | 10/2006 | Walker et al. |
| 2006/0247012 | A1 | 11/2006 | Walker et al. |
| 2007/0149278 | A1 | 6/2007 | Walker et al. |
| 2007/0155465 | A1 | 7/2007 | Walker et al. |
| 2008/0026848 | A1 | 1/2008 | Byng |
| 2010/0004057 | A1 | 1/2010 | Acres |
| 2010/0004058 | A1 | 1/2010 | Acres |
| 2010/0160035 | A1 | 6/2010 | Hermann |
| 2011/0269532 | A1 | 11/2011 | Shuster et al. |
| 2012/0046111 | A1 | 2/2012 | Walker et al. |
| 2012/0270623 | A1 | 10/2012 | Walker et al. |
| 2012/0270646 | A1 | 10/2012 | Walker et al. |
| 2012/0270660 | A1 | 10/2012 | Walker et al. |
| 2013/0012293 | A1 | 1/2013 | Walker et al. |
| 2013/0084941 | A1 | 4/2013 | Caputo et al. |
| 2016/0260288 | A1 | 9/2016 | Arnone et al. |
| 2016/0260290 | A1 | 9/2016 | Walker et al. |
| 2017/0337778 | A1 | 11/2017 | Shuster et al. |
| 2018/0053194 | A1 | 2/2018 | Bond et al. |

OTHER PUBLICATIONS

"Cryptocurrency," Wikipedia, last updated Aug. 27, 2018, 19 pages [retrieved online from: en.wikipedia.org/w/index.php?title=Cryptocurrency&oldid=856752813].

Evangelho "Mining 101: An Introduction To Cryptocurrency Mining," Forbes, Mar. 13, 2018, 7 pages [retrieved online from: www.forbes.com/sites/jasonevangelho/2018/03/13/mining-101-what-exactly-is-cryptocurrency-mining/?sh=10dad1a8a83a].

Official Action for U.S. Appl. No. 16/280, 127, dated Aug. 7, 2020 6 pages Restriction Requirement.

Official Action for U.S. Appl. No. 16/280, 127, dated Jan. 7, 2021 16 pages.

Notice of Allowance for U.S. Appl. No. 16/280,127, dated Jun. 23, 2021 21 pages.

Notice of Allowance for U.S. Appl. No. 17/479,235, dated Aug. 1, 2022 9 pages.

* cited by examiner

METHOD AND SYSTEM FOR PLAYER GROUP SHARING AND REDISTRIBUTING GAMING AWARDS

CROSS REFERENCE TO RELATED APPLICATION

The present application is a continuation of and claims priority to U.S. application Ser. No. 17/479,235, filed Sep. 20, 2021, which is a continuation of U.S. application Ser. No. 16/280,127, filed Feb. 20, 2019, now U.S. Pat. No. 11,158,169, issued Oct. 26, 2021, the entire disclosures of which are hereby incorporated by reference.

BACKGROUND

The present disclosure relates generally to gaming systems and, in particular, to award redistribution in a gaming system.

In slots and other games of chance, casinos may use smaller awards to attract players, prolong games, and increase player loyalty.

BRIEF SUMMARY

In certain embodiments, the present disclosure relates to an electronic gaming system in which awards, such as bonuses, are capable of being redistributed among multiple player members of a group during a group gaming session. In some embodiments, the electronic gaming system comprises a communication interface, a processor coupled with the communication interface, and a memory coupled with and readable by the processor and storing therein a set of instructions. The set of instructions, when executed by the processor causes the processor to form a multi-player group to play a gaming session, the multi-player group comprising first and second player members corresponding to first and second gaming devices, respectively; receive, from the first gaming device, first game play information for a first game played by the first player member on the first gaming device; determine that the first game play information comprises a first winning outcome corresponding to a first winning outcome; in response to the determination that the first player member has won the first winning outcome, allocate the first winning outcome among the first and second player members, wherein a first portion of the first price is allocated to the first player member and a second portion of the first winning outcome is allocated to the second player member; and notify the second gaming device that the second player member has received the second portion of the first winning outcome.

In some embodiments, a method for sharing player awards in a gaming system comprises forming a multi-player group to play multiple games in a group gaming session; receiving game play information for a game; determining that the game play information comprises a winning outcome corresponding to an award; in response to determining that the game play information comprises the winning outcome, allocating, the winning outcome among the player members of the multi-player group; and notifying a gaming device corresponding to each player member of the multi-player group of the share of the winning outcome allocated to the respective player member.

In some embodiments, a system is provided that includes: a user interface, a processor coupled with the user interface, and a memory coupled with and readable by the processor and storing therein a set of instructions which, when executed by the processor causes the processor to: receive a group formation request from a player member to form a multi-player group comprising the player member, the group formation request comprising a number of player members invited to be in the multi-player group, optionally an invitation code to be input by each of the invited player members, and a predetermined rule set defining the winning outcome allocation among the player members of the multi-player group and the duration of the multi-player group; cause the user interface to notify the player member that the multi-player group has been formed; while a game of a gaming session is played by the player member, receive an award sharing message that a different player member in the group has won a winning outcome in a separate game of the gaming session and a share of the winning outcome allocated to the player member; and cause the user interface to notify the player member that the player member has won the allocable share of the winning outcome.

Additional features are described herein and will be apparent from the following Description and the figures.

DETAILED DESCRIPTION

Figure 5:
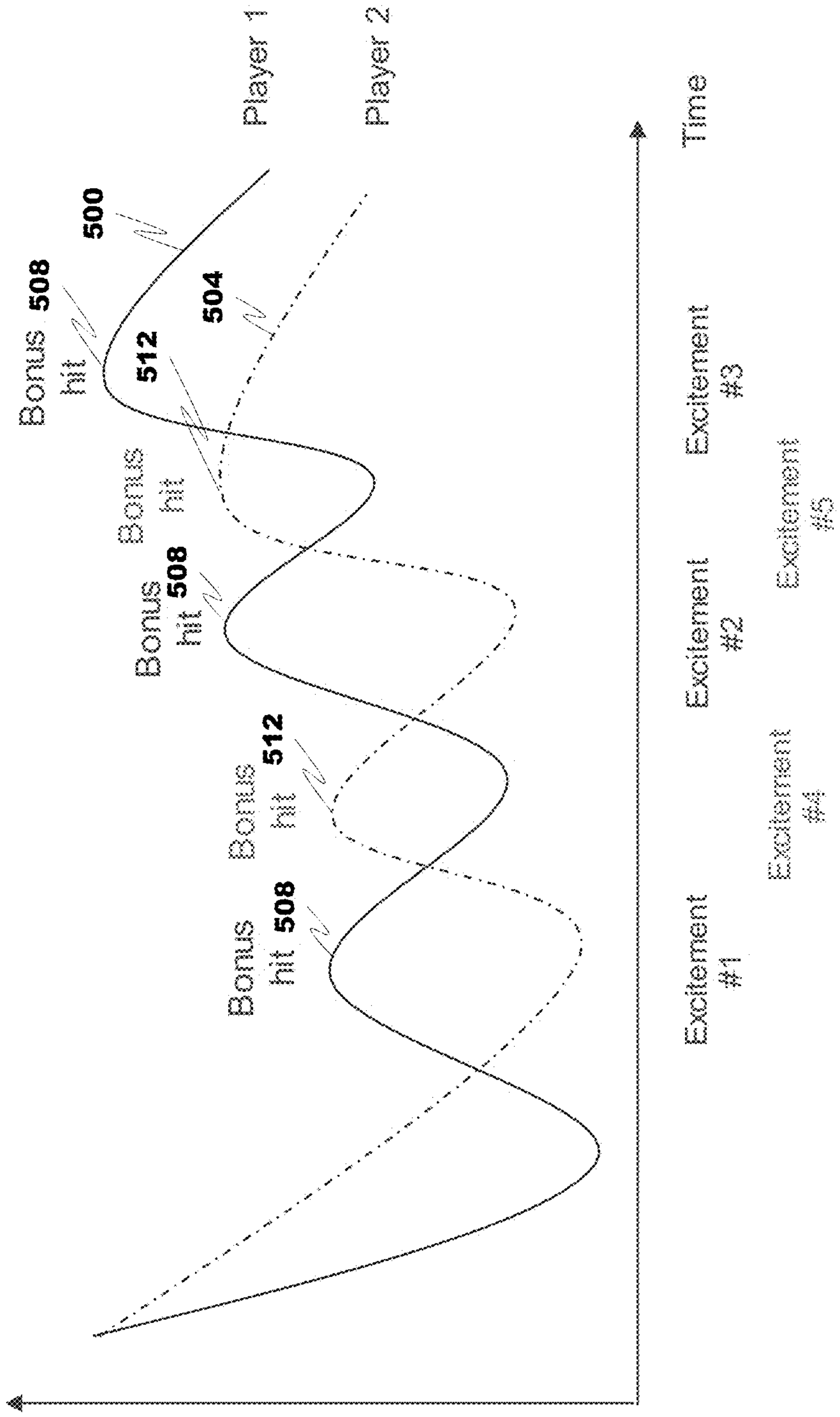
FIG. 5 is a plot of excitement level (vertical axis) versus time (horizontal axis) in accordance with embodiments of the present disclosure.

Embodiments of the present disclosure will be described in connection with a gaming system having one or multiple user devices that enable gaming activity. While certain embodiments of the present disclosure will reference the use of an Electronic Gaming Machine (EGM) as a gaming device that enables players to participate in gaming activity, it should be appreciated that embodiments of the present disclosure are not so limited. Embodiments of the present disclosure will be described in connection with a gaming system that can provide an improved gaming experience for a player by increasing a number and frequency of player awards while increasing gaming revenue for casinos (without requiring additional casino funding or change of casino payout tables for the games in the gaming session). In some embodiments, the gaming system can enable a group of players to redistribute and share in one another's awards and experience higher levels of excitement and customer satisfaction due to group participation in award-winning events. The excitement, happiness, and lucky times shared by the player members in the group are illustrated in FIG. 5, which is a plot of excitement level (vertical axis) versus time (horizontal axis). A first waveform 500 represents a time-dependent excitement profile for a first player member (referenced as "player 1") while a second waveform 504 represents a time-dependent excitement profile for a second player member (referenced as "player 2"). The first player member has bonus hit events at points 508 while the second player member has bonus hit events at points 512. Redistribution of shared portions of the bonus causes the first player member to share in the second player member's experience in bonus hit events 512, and the second player member to share in the first player member's experience in bonus hit events 508. If enough player members are in the group, the peaks of each waveform associated with each of the player members can merge, through award sharing and redistribution, into a more linear waveform. This causes the overall excitement levels of each player member to rise over time as shown by the upward trend of each of the first and second waveforms 500 and 504.

The gaming experience can be further improved in many applications. Games can have payout tables which will enable players to win smaller and more frequent bonuses compared to normal payout tables and custom design special effects for award sharing, particularly for the member of the group receiving the largest portion from sharing in a randomly distributed award sharing winning outcome.

The multi-player group can enhance user social experiences. Players can use a service window or mobile application product to receive an award sharing message through a mobile device, which can be used by group player members that are not in the casino.

The improved player experience may result in increased player loyalty due to the fact that the players have more opportunities to win and a more continuous player engagement is achieved. The devices that enable such an improved player experience may be more desirable than devices and systems that simply adhere to payout tables providing a single player with smaller and more frequent awards.

Figure 1:
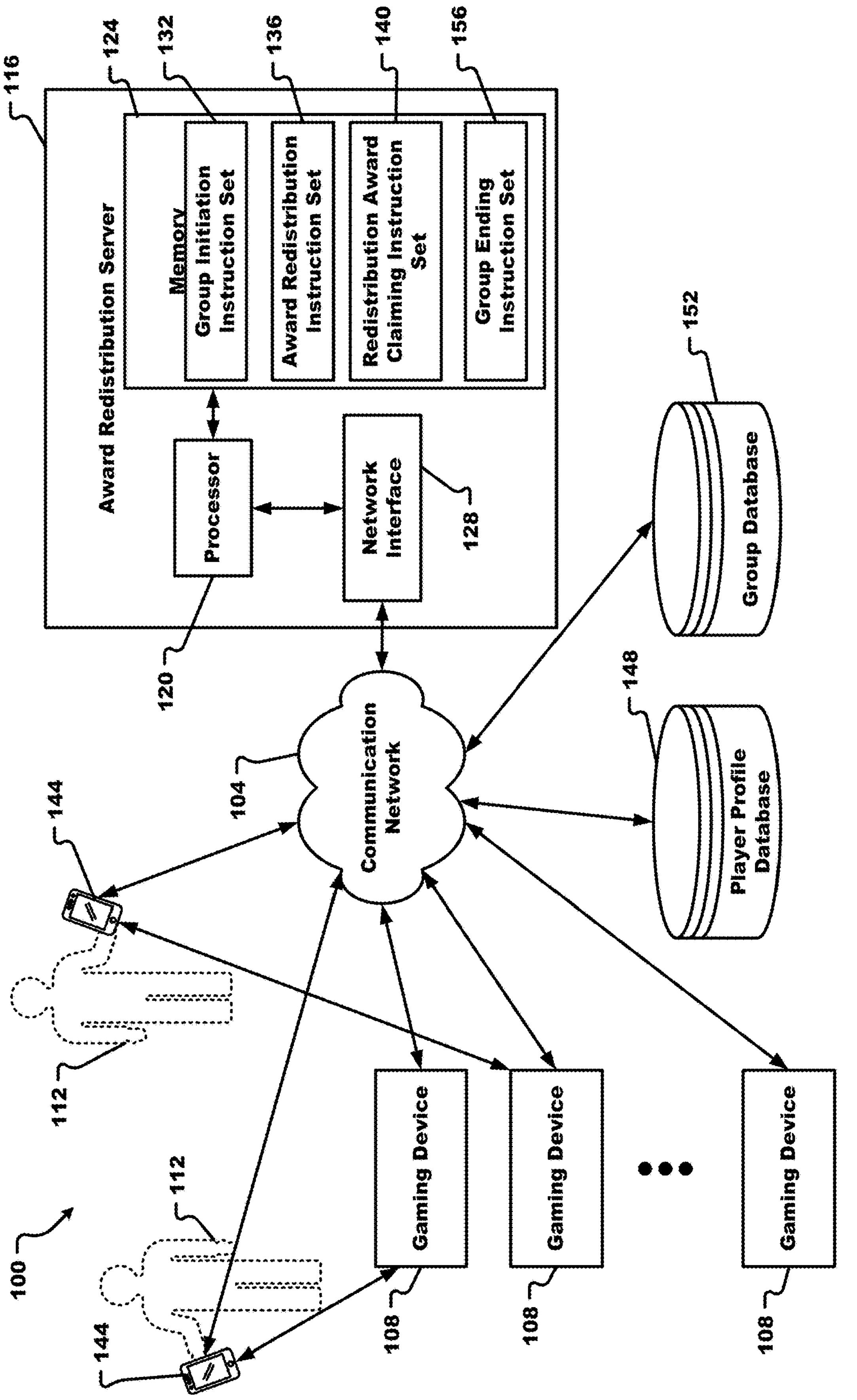
FIG. 1 is a block diagram of a gaming system accordance with embodiments of the present disclosure.

With reference now to FIG. 1, details of an illustrative gaming system 100 will be described in accordance with at least one embodiment of the present disclosure. The components of the gaming system 100, while depicted as having particular instruction sets and devices, are not necessarily limited to the examples depicted herein. Rather, a gaming system 100 according to embodiments of the present disclosure may include one, some, or all of the components depicted in the gaming system 100 and does not necessarily need to include all of the components in a single device. For instance, the components of a server may be distributed amongst a plurality of servers and/or other devices (e.g., a gaming device, portable user device, etc.) in the gaming system 100 without departing from the scope of the present disclosure.

The gaming system 100 is shown to include a communication network 104 that interconnects and facilitates machine-to-machine communications between one or multiple gaming devices 108, a player profile database 148, a group database 152, and an award distribution server 116. It should be appreciated that the communication network 104 may correspond to one or many communication networks without departing from the scope of the present disclosure. In some embodiments, the various gaming devices 108 and award redistribution server(s) 116 may be configured to communicate using various nodes or components of the communication network 104. The communication network 104 may comprise any type of known communication medium or collection of communication media and may use any type of protocols to transport messages between end-points. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, the gaming devices 108 may be distributed throughout a single property or premises (e.g., a single casino floor) or the gaming devices 108 may be distributed among a plurality of different properties. In a situation where the gaming devices 108 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 108 may utilize the same or different types of communication protocols to connect with the communication network 104. It should also be appreciated that the gaming devices 108 may or may not present the same type of game to players 112. For instance, a first gaming device 108*a* and a second gaming device 108*b* may correspond to gaming devices that present a slot game. In another example, the first gaming device 108*a* may correspond to a slot game and the second gaming device 108*b* may correspond to a video poker game, and other gaming devices may present other types of games or a plurality of different games for selection and eventual play by the players 112. It may be possible for the some of the gaming devices 108 to communicate with one another via the communication network 104. In some embodiments, one or more of the gaming devices 108 may only be configured to communicate with a centralized management server and/or the award distribution server 116. Although not depicted, the system 100 may include a separate server or collection of servers that are responsible for managing the operation of the various gaming devices 108 in the gaming system 100. It should also be appreciated that the award distribution server 116 may or may not be co-located with one or more gaming devices 108 in the same property or premises. Thus, one or more gaming devices 108 may communicate with the award distribution server 116 over a WAN, such as the Internet. In such an event, a tunneling protocol or Virtual Private Network (VPN) may be established over some of the communication network 104 to ensure that communications between a gaming device 108 and a remotely-located server 116 are secured. Additionally or alternatively, one or multiple gaming devices 108 may function as the award distribution server 116.

One, some, or all of the gaming devices 108 may correspond to a type of device that enables a first player 112 to interact with a second player 112 in connection with playing games of chance and/or skill. A gaming device 108 may include any type of known gaming device such as a slot machine, a table game, an electronic table game (e.g., video poker), a skill-based game, etc. The gaming device 108 can be in the form of an electronic gaming machine (EGM), virtual gaming machine, video game gambling machine (VGM), or other computing device, personal gaming device, or collection of computing devices.

In addition to playing games on a gaming device 108, the players 112 may also be allowed to interact with and play games of chance and/or skill on respective mobile devices 144. A mobile device 144 may correspond to a player's 112 personal device (e.g., a smartphone) or to a device issued to the player 112 during the player's visit at a particular casino. It should be appreciated that the player 112 may play games directly on their mobile device 144 and/or the mobile device 144 may be in communication with a gaming device 108 such that the mobile device 144 provides the human-to-machine interface for the player 112 to the gaming device 108. As shown in FIG. 1, the mobile device 144 may be in communication with the communication network 104 or in direct communication (e.g., via Bluetooth, WiFi, etc.) with a gaming device 108. Non-limiting examples of a mobile device 144 include a cellular phone, a smart phone, a tablet, a wearable device, an augmented reality headset, a virtual reality headset, a laptop, a Personal Computer (PC), or the like.

The award distribution server 116 is further shown to include a processor 120, memory 124, and a network interface 128. These resources may enable functionality of the award distribution server 116 as will be described herein. For instance, the network interface 128 provides the server 116 with the ability to send and receive communication packets or the like over the communication network 104. The network interface 128 may be provided as a network interface card (NIC), a network port, drivers for the same, and the like. Communications between the components of the server 116 and other devices connected to the communication network 104 may all flow through the network interface 128.

The processor 120 may correspond to one or many computer processing devices. For instance, the processor 120 may be provided as silicon, as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 120 may be provided as a microprocessor, Central Processing Unit (CPU), or plurality of microprocessors that are configured to execute the instructions sets stored in memory 124. Upon executing the instruction sets stored in memory 124, the processor 120 enables various functions of the award distribution server 116.

The memory 124 may include any type of computer memory device or collection of computer memory devices. The memory 124 may be volatile or non-volatile in nature and, in some embodiments, may include a plurality of different memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instruction sets depicted in addition to temporarily storing data for the processor 120 to execute various types of routines or functions. Although not depicted, the memory 124 may include instructions that enable the processor 120 to store data into a player profile database 148 and/or player group database 152 and retrieve information from the databases. Alternatively or additionally, the player profile database 148 or data stored therein may be stored internal to the server 116 (e.g., within the memory 124 of the server 116 rather than in a separate database). Alternatively or additionally, the player group database 152 or data stored therein may be stored internal to the server 116.

Illustrative instruction sets that may be stored in memory 124 include, without limitation, a group initiation instruction set 132, an award redistribution instruction set 136, redistribution award claiming instruction set 140, and a group ending instruction set 156. Functions of the server 116 enabled by these various instruction sets will be described in further detail herein. It should be appreciated that the instruction sets depicted in FIG. 1 may be combined (partially or completely) with other instruction sets or may be further separated into additional and different instruction sets, depending upon configuration preferences for the server 116. Said another way, the particular instruction sets depicted in FIG. 1 should not be construed as limiting embodiments described herein.

In some embodiments, the group initiation set 132, when executed by the processor 120, may enable the award distribution server 116 to create a group of players, or player members, that share gaming awards with other player members. The group initiation instruction set applies group initiation rules that define the requirements for an award redistribution group to be validly formed. For example, the group initiation rules define a minimum or maximum number of player members and minimum or maximum funding amount in a group wager credit account that funds game wagers of the player members. A group can be formed when a gaming device receives a group formation request to form a gaming award sharing group. The request typically specifies a number and identity (such as a name of the player, link to a player profile for the player, or other identifier) and/or contact information (such as electronic address of the player's mobile device 144, a uniform resource locater of the player's web page on a social network web site, email address of the player, or other contact information) of players to be invited to join the group, optionally an invitation code, and criteria to end award redistribution in the group. When the invited players enter the invitation code, the group is formed and a group gaming session can be initiated. In another example, the gaming device receives the group formation request, and the gaming system 100 broadcasts the group formation information to all or portion of the casino floor. Other players, with whom the group creator may or may not be familiar, can join or select the group as a preferred group from a group list view of multiple different groups concurrently being formed and then join. The group gaming session starts when a specified player amount is reached within a specified time period. This example enables players to visit a casino and play in a group gaming session with a group of strangers. In the group gaming session, each of the player members plays a separate, independent, or discrete, game on a corresponding gaming device 108 and shares in one another's awards.

In some embodiments, the award redistribution instruction set 136, when executed by the processor 120, may enable the award distribution server 116 to apply award redistribution rules to know when and how to redistribute an award of a player member among other player members in the group. The award may be eligible for sharing, for example, when it falls within a defined award amount range, when it is below a defined award amount, or when it is above a defined award amount. The award may be distributed in any predefined manner, whether equally, unequally, randomly or pseudo-randomly. The random or pseudorandom distribution award shares can vary award-by-award throughout the group gaming session whereby a first player member in a first gaming session receives a first share of an award and later in the first gaming session receives a different second share of another award. The player creating group generally defines when and how the award will be distributed among the player members in the group.

The redistribution award claiming instruction set 140, when executed by the processor 120, may enable the award distribution server 116 to apply redistribution award claiming rules to determine how a redistributed award can be claimed by a player member. For example, in response to receipt of a notification message a player member can be required to perform a defined action to claim the redistributed award. By way of illustration, a player member's right to claim the redistributed award share can expire if the player member does not open the notification message within a specified time after the group ends. If a redistributed award share is not claimed by a player member, it is generally redistributed to other player members who properly claimed his or her share of the award. In another example, a player member can only withdraw his or her redistributed award share after his or her gaming turnover (or cumulative wagers during the gaming session) reaches a specified amount. Otherwise, the redistributed award share will be redistributed to other player members whose turnover reaches the specified amount. The redistribution of the unclaimed award share can be equally, unequally, randomly or pseudo-randomly.

The group ending instruction set 156, when executed by the processor 120, may enable the award distribution server 116 to apply group ending rules to determine when the group, group gaming session, or group award redistribution, ends. For example, the group, group gaming session, or group award redistribution can end when a specified gaming session time is reached, the cumulative wagers or collective turnover of the player members in the group teaches a specified amount, each of the player members has spent a targeted gaming or cumulative wager amount, or a group wager credit account decreases to a predetermined level. The group wager credit account can include a portion of the redistributed award.

Figure 2:
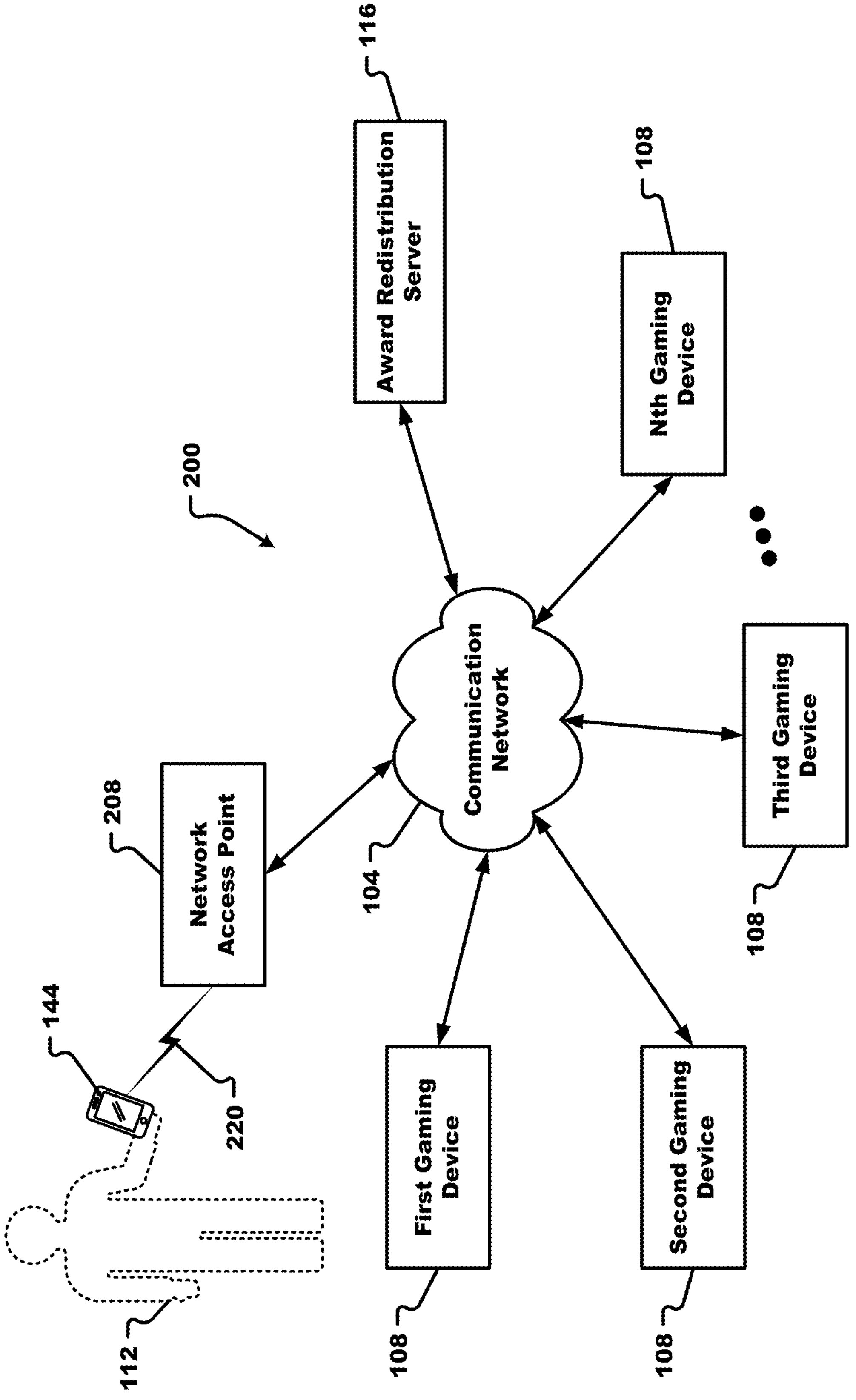
FIG. 2 is a block diagram depicting additional aspects of a gaming system in accordance with embodiments of the present disclosure.

With reference now to FIG. 2, additional details of the gaming system 200 will be described in accordance with at least some embodiments of the present disclosure. The gaming system 200 may be similar or identical to the gaming system 100 depicted in FIG. 1. In some embodiments, the gaming system 200 may utilize the communication network 104 to facilitate communications between various nodes of the gaming system 200. Non-limiting examples of the nodes that may belong to the gaming system 200 include the gaming devices 108 or components within the gaming devices 108, the award redistribution server 116, and network access points 208. The gaming system 200 may also include a mobile device 144, which may be enabled to connect with the communication network 104 via a network access point 208. When connected with the communication network 104, the mobile device 144 may also be considered a node in the system 200.

In some embodiments, some of the first and second gaming devices 108*a-c* may be located at a first property or premises (e.g., within a first casino building). Other gaming devices, such as the third . . . nth gaming devices EGM 108*c-n* may be located at a second property or premises (e.g., within a second casino building). These different properties or premises may be owned by a common entity or may be owned by different entities. In some embodiments, different player members 112 in a group playing at the first and second properties share awards arising from separate or discrete games played on different gaming devices 108 during a group gaming session involving player members playing on the first, second, third, . . . nth gaming devices 108.

Figure 3:
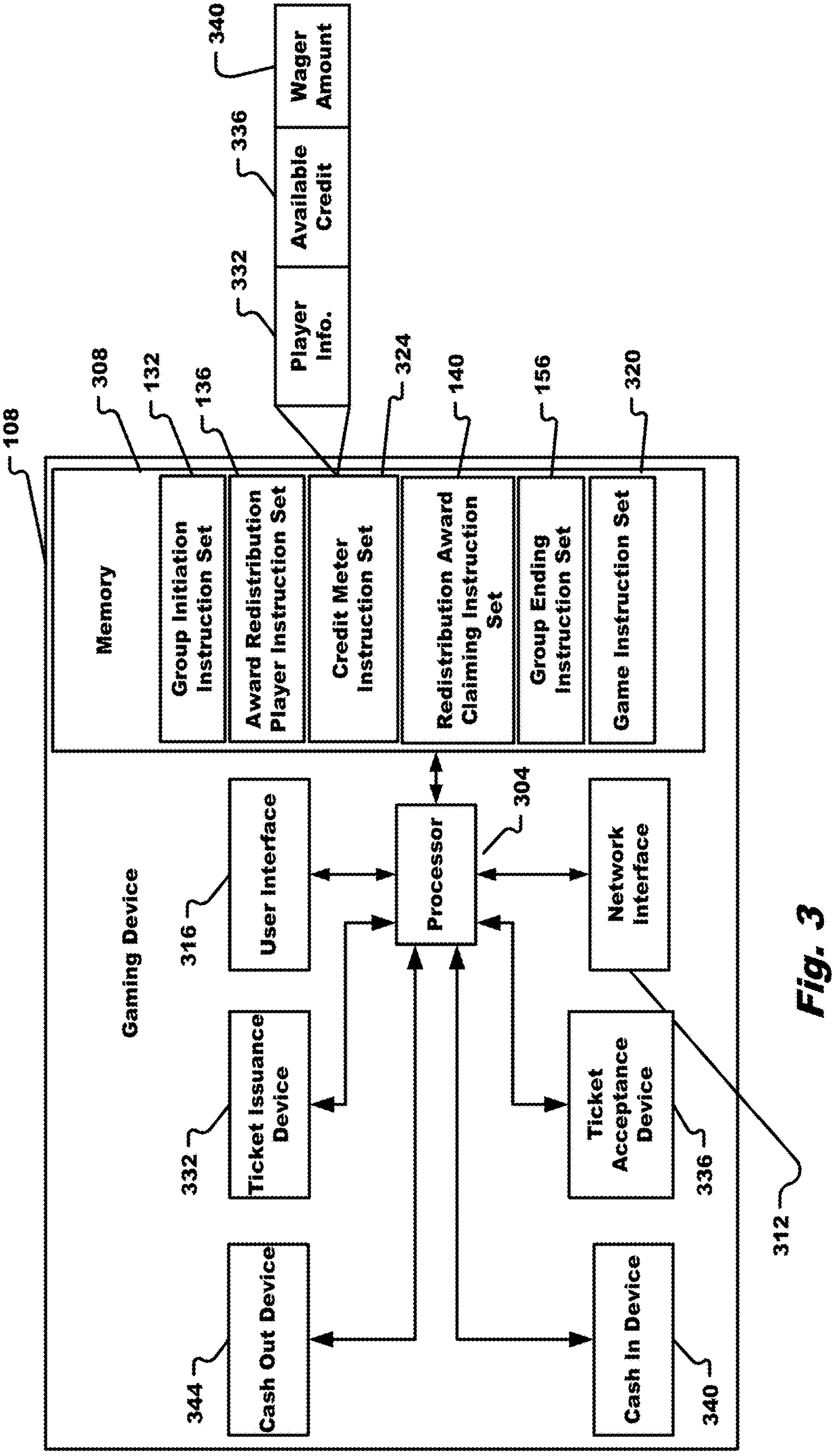
FIG. 3 is a block diagram depicting details of an electronic gaming machine in accordance with embodiments of the present disclosure.

With reference now to FIG. 3, additional details of a gaming device 108 will be described in accordance with at least some embodiments of the present disclosure. While depicted as a gaming device 108, it should be appreciated that some or all of the components of the gaming device 108 may be included in a player's 112 mobile device 144 without departing from the scope of the present disclosure.

The gaming device 108 is depicted to include a processor 304, memory 308, a network interface 312, and a user interface 316. In some embodiments, the processor 304 may be similar or identical to the processor 120. In other words, the processor 304 may correspond to one or many microprocessors, CPUs, microcontrollers, or the like. The processor 304 may be configured to execute one or more instruction sets stored in memory 308.

The network interface 312 may also be similar or identical to network interface 128. The nature of the network interface 312, however, may depend upon whether the network interface 312 is provided in a gaming device 108 or a mobile device 144. Examples of a suitable network interface 312 include, without limitation, an Ethernet port, a USB port, an RS-232 port, an RS-485 port, a NIC, an antenna, a driver circuit, a modulator/demodulator, etc. The network interface 312 may include one or multiple different network interfaces depending upon whether the gaming device 108 is connecting to a single communication network 104 or multiple different types of communication networks 104. For instance, the gaming device 108 may be provided with both a wired network interface and a wireless network interface without departing from the scope of the present disclosure.

The user interface 316 may correspond to any type of input and/or output device that enables the player 112 to interact with the gaming device 108. As can be appreciated, the nature of the user interface 316 may depend upon the nature of the gaming device 108. For instance, if the gaming device 108 is a traditional mechanical reel slot machine, then the user interface 316 may include one or more mechanical reels with symbols provided thereon, one or more lights or LED displays, one or more depressible buttons, a lever or "one armed bandit handle", a speaker, or combinations thereof. If the gaming device 108 is a digital device, then the user interface 316 may include one or more touch-sensitive displays, LED/LCD display screens, etc.

The memory 308 may be similar or identical to memory 124. For instance, the memory 308 may include one or multiple computer memory devices that are volatile or non-volatile. The memory 308 may be configured to store instruction sets that enable player interaction with the gaming device 108, that enable game play at the gaming device 108, and/or that enable coordination with the award aggregation server 116. Examples of instruction sets that may be stored in the memory 308 include the group initiation instruction set 132, award redistribution player instruction set 136, a game instruction set 320, a credit meter instruction set 324, redistribution award claiming instruction set 140, and group ending instruction set 156. In some embodiments, the game instructions 320, when executed by the processor 304, may enable the gaming device 108 to facilitate one or more games of chance or skill and produce interactions between the player 112 and the game of chance or skill. In some embodiments, the game instructions 320 may include subroutines that present one or more graphics to the player 112 via the user interface 316, subroutines that calculate whether a particular wager has resulted in a win or loss during the game of chance or skill, subroutines for determining payouts for the player 112 in the event of a win, subroutines for exchanging communications with a connected server (e.g., award redistribution server 116, or the like), subroutines for enabling the player 112 to engage in a game using their mobile device 144, and any other subroutine or set of instructions that facilitate gameplay at or in association with the gaming device 108.

The credit meter instruction set 324 may correspond to a secure instruction set within the gaming device 108 that facilitates a tracking of activity at the gaming device 108. In some embodiments, the credit meter instruction set 324 may be used to store or log information related to various player 112 activities and events that occur at the gaming device 108. The types of information that may be maintained in the credit meter instruction set 324 include, without limitation, player information 332, available credit information 336, wager amount information 340, and other types of information that may or may not need to be recorded for purposes of accounting for wagers placed at the gaming device 108 and payouts made for a player 112 during a game of chance or skill played at the gaming device 108. In some embodiments, the credit meter instruction set 324 may be configured to track coin in activity, coin out activity, coin drop activity, jackpot paid activity, mini bonus paid activity, credits applied activity, external bonus payout activity, voucher in activity, voucher out activity, timing of events that occur at the gaming device 108, and the like. In some embodiments, certain portions of the credit meter instruction set 324 may be updated in response to outcomes of a game of chance or skill played at the gaming device 108 or the gaming device of another player member, such as a respective redistributed share of an award of another player member. Some or all of the data within the credit meter instruction set 324 may be reported to or received from the award redistribution server 116, for example, if such data applies to an award event belonging to a plurality of events being tracked for a player 112 of the gaming device 108 or if such data applies to an award event belonging to a plurality of events being tracked for a different player 112 of a different gaming device 108, respectively. As an example, the number, value, and timing of wagers placed by a particular player 112 and payouts on such wagers may be reported to the award redistribution server 116 if any of such information applies to a plurality of events being tracked by the award redistribution server 116 for the player members of a group.

Figure 4A:
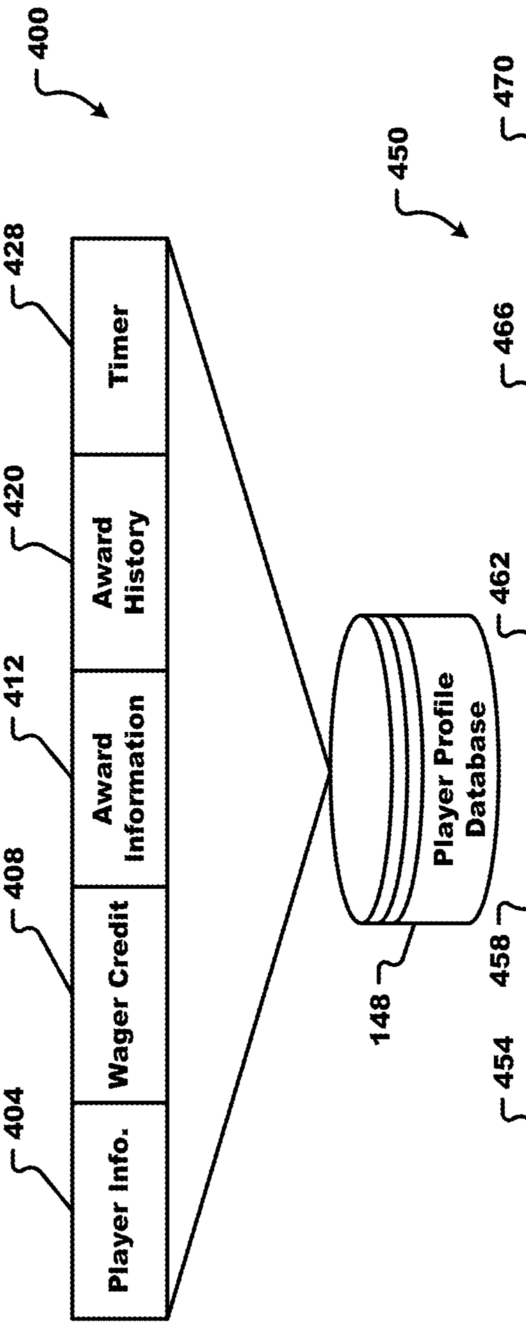
FIG. 4A is a block diagram depicting an illustrative data structure used in a player profile database in accordance with embodiments of the present disclosure.

With reference now to FIG. 4A, additional details of data that may be stored in the player profile database 148 will be described in accordance with at least some embodiments of the present disclosure. The database 148 may be configured to store one or multiple data structures 400 that are used in connection gaming activities of a player. In some embodiments, the data stored in the data structure 400 may be stored for a plurality of different player profiles or for a single player profile. The data structure 400 may include a plurality of data fields that include, for instance, a player information field 404, a wager credit field 408, an award information field 412, an event history field 416, an award history field 420, an aggregate activity field 424, and a timer field 428.

The player information field 404 may be used to store any type of information that identifies a player. In some embodiments, the player information field 404 may store one or more of username information for a player 112, contact information for the player (such as email address, phone number, social website webpage universal resource locator, and the like), password information for a player account, player status information, accommodations associated with the player 112, and any other type of customer service management data that may be stored with respect to a player 112.

The wager credit field 408 may be used to store data about a player's 112 available credit with a casino or a plurality of casinos. For instance, the wager credit field 408 may store an electronic record of available credit in the player's account and whether any restrictions are associated with such credit. The wager credit field 408 may further store information describing a player's available credit over time, wagers made over time, cash out events for the player, winning events for the player, and the like.

The award information field 412 may be used to store information describing awards that have been paid to the player 112 or that are available to be paid in response to particular events occurring within the gaming system 100, 200. As a non-limiting example, the award information field 412 may be used to store electronic records for values of awards that are available to or have been paid to the player 112. Even more specifically, the award information field 412 may store values of redistributed shares awards that will be paid to the player 112 if a particular event occurs, such as within a predetermined amount of time (as monitored by a timer value in the timer field 428). For example, the particular event could be one or more of a player member's received award sharing message expiring before the player member opens the message or fails to perform another predetermined activity before a timer has the timer value in the timer field 428. In another example, the particular event could be one or more of a player member's gaming turnover (the cumulative wagers placed) in the wager credit field 408 for the group gaming session does not have a minimum value before termination of the gaming session or a timer has the timer value in the timer field 428.

The award history field 420 may store data related to awards, bonuses, mini bonuses, jackpots, etc. granted to the player 112, including redistributed shares of an award of other player members in the group. The award history field 420 may also indicate when such awards were granted to the player 112, whether the awards have been redeemed, whether the awards are being funded by a game of chance or skill, a mini bonus associated with an event, or a jackpot award associated with the player 112 completing a plurality of events.

The timer field 428 may be used to store a timer value associated with tracking whether or not a particular player 112 has completed a particular event or a plurality of events within a predetermined amount of time. The value of the timer within the timer field 428 may count up, count down, or increment in any known way to track a passage of time. Alternatively or additionally, time may be measured by an occurrence of events within the gaming system 100, 200 rather than being measured absolutely. Specifically, the predetermined amount of time may be associated with determining whether an individual player 112 of the group has completed an event or a plurality of events (e.g., claimed a redistributed award share). Thus, the timer does not necessarily need to count a passage of time with seconds and minutes, but rather may count a passage of time based on activities and events that occur within the system 100, 200.

Figure 4B:
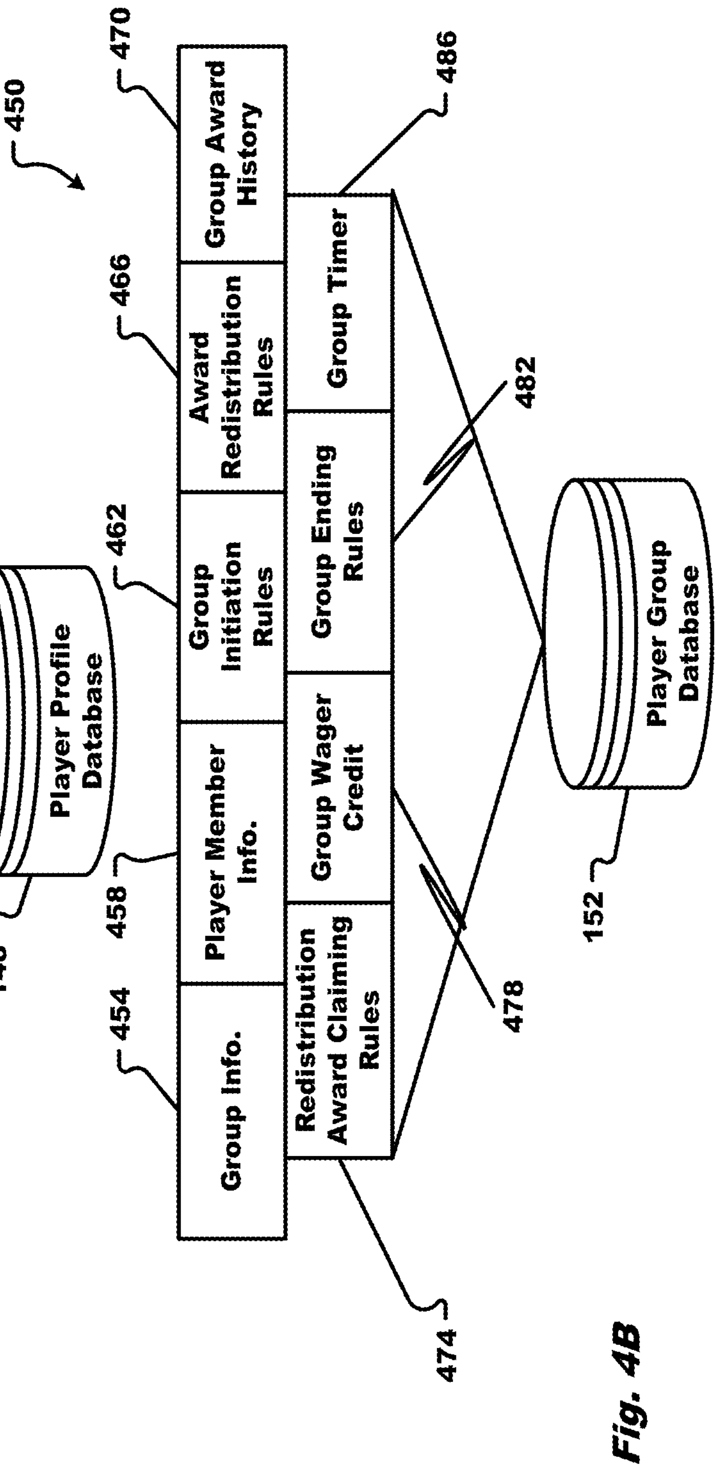
FIG. 4B is a block diagram depicting an illustrative data structure used in a player group database in accordance with embodiments of the present disclosure.

With reference now to FIG. 4B, additional details of data that may be stored in the player group database 148 will be described in accordance with at least some embodiments of the present disclosure. As in the case of the player profile database 148, the database 152 may be configured to store one or multiple data structures 450 that are used in connection with tracking player group progress with respect to particular events as well as a plurality of events. In some embodiments, the data stored in the data structure 450 may be stored for a plurality of different player group profiles or for a single player group profile. The data structure 450 may include a plurality of data fields that include, for instance, a group information field 454, player member information field 458, group initiation rules field 462, award redistribution rules field 466, group award history field 470, redistribution award claiming rules field 474, a group wager credit field 478, a group ending rules field 482, and a group timer field 486.

The group information field 454 may be used to store any type of information that identifies a group of players. In some embodiments, the group information field 454 may store one or more of username information for a group, password information for a group account, group status information, and any other type of customer service management data that may be stored with respect to a group.

The player member information field 458 may be used to store any type of information that identifies the player members of the corresponding group of players. In some embodiments, the player member information field 458 may store one or more of username information for each player member or a link to the corresponding player information field 404 or data structures 400 of each player member.

The group initiation rules field 462 can include one or more rules defining the requirements for the group to be validly formed, such as a process or protocol for forming the group, the requirements for a player to be eligible to be a member of the group or maintain eligibility during the group gaming session, and the like. For example, the group initiation rules can, as a precursor to a validly formed group, define a minimum or maximum number of player members or minimum or maximum funding amount in a group wager credit that funds game wagers of the player members and, for eligible player invitees, location-based requirements to be eligible to join the group. The rules can define the process or protocol as a gaming device receiving a group formation request to form a gaming award sharing group, the required contents of the request (e.g., one or more of a number and identity (such as a name of the player, link to a player profile for the player, or other identifier) and contact information (such as electronic address of the player's mobile device 144, a social account or uniform resource locater of the player's web page on a social network (such as Facebook™, LinkedIn™, Instagram™ WeChat™, etc.), email address of the player, or other contact information) of players to be invited to join the group, an optional invitation code (such as a quick response code or short code), criteria defining when and how a player member award will be distributed among the player members in the group, and criteria to end award redistribution in the group), and/or how the players are to be invited to join the group (e.g., by invitation sent by a selected communication modality, such as email, text, tweet, SMS, etc. to a player invitee's mobile device, by invitation sent to a (selected) gaming device currently interacting with the player invitee, or simply by inputting the invitation code and/or group username directly or indirectly into a gaming device within a selected period of time).

The award redistribution rules field 466 can include one or more rules defining when and how to redistribute an award of a player member among other player members in the group. The award may be eligible for sharing, for example, when it falls within a defined award amount range, when it is below a defined award amount, or when it is above a defined award amount. The award may be distributed in any predefined manner, whether equally, unequally, randomly or pseudo-randomly.

The group award history field 470 may store data related to awards, bonuses, mini bonuses, jackpots, etc. redistributed to player members of the group. The award history field 420 may also indicate when such redistributed award shares were granted to each player member, whether the redistributed award shares have been redeemed, and whether the redistributed award shares were not redeemed and redistributed to other player members.

The redistribution award claiming rules field 474 can include one or more rules defining how a redistributed award can be claimed by a player member. For example, in response to receipt of a notification message a player member can be required to perform a defined action to claim the redistributed award. By way of illustration, a player member's right to claim the redistributed award share can expire if the player member does not open the notification message within a specified time after the group ends. In another example, a player member can only withdraw his or her redistributed award share after his or her gaming turnover (or cumulative wagers during the gaming session) reaches a specified amount.

The group wager credit field 478 may be used to store data about the group's available credit with a casino or a plurality of casinos. For instance, the group wager credit field 478 may store an electronic record of available credit in each of the player member's accounts and whether any restrictions are associated with such credit. The wager credit field 408 may further store information describing the group's available credit over time, wagers made by player members over time, cash out events for each of the player members, winning events for the player members during the group gaming session, and the like. In some applications, the player creating the group can deposit a certain amount of money as a gaming fund recorded in the group wager credit field 478 to be used as wagers by the player members during the group gaming session.

The group ending rules field 482 can include one or more rules defining when the group, or group award redistribution, ends. For example, the group or group award redistribution can end when a specified gaming session time is reached, the cumulative wagers or collective turnover of the player members in the group teaches a specified amount, each of the player members has spent a targeted gaming or cumulative wager amount, or a group credit decreases to a predetermined level. The group wager credit can include a portion of the redistributed award.

The group timer field 486 may be used to store a timer value associated with tracking whether or not the group has expired in accordance with the group ending rules. The value of the timer within the timer field 428 may count up, count down, or increment in any known way to track a passage of time. Alternatively or additionally, time may be measured by an occurrence of events within the gaming system 100, 200 rather than being measured absolutely. Specifically, the predetermined amount of time may be associated with determining whether an individual player 112 of the group or the group of players itself has completed an event or a plurality of events. Thus, the timer does not necessarily count a passage of time with seconds and minutes, but rather may count a passage of time based on activities and events that occur within the system 100, 200.

Figure 6:
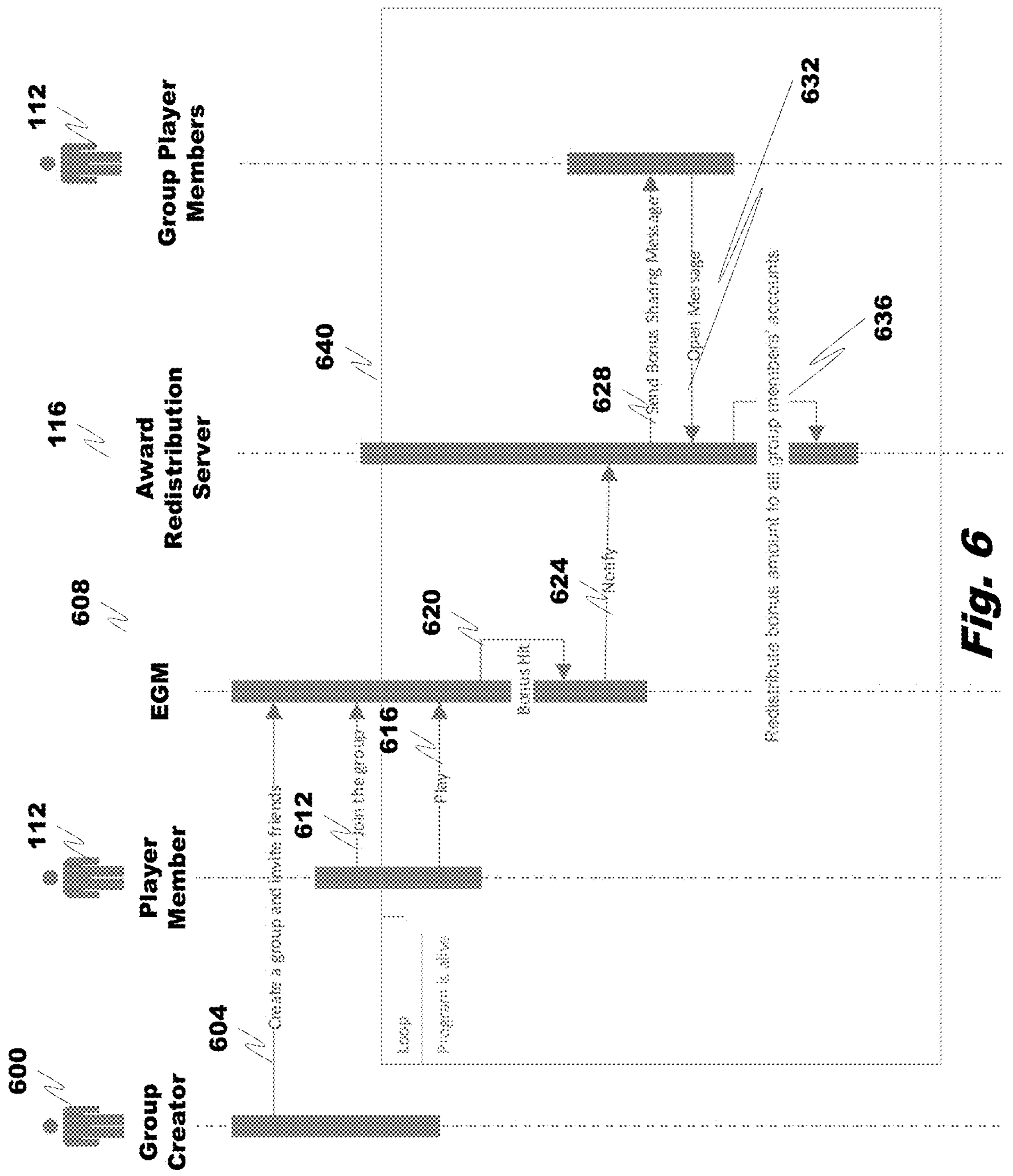
FIG. 6 is a block diagram depicting messaging flows in accordance with embodiments of the present disclosure.

With reference now to FIG. 6, an example of the disclosure will be described. An electronic gaming machine (EGM) 608 receives, from a player 112, acting as a group creator 600, a group formation request 604 to create a group and invite other friends as player members of the group. In response, the EGM 608 causes the award redistribution server 116 to form the group. One or more players 112 join the group by inputting, via a join request 612, into a different EGM 608 an invitation code selected by the group creator 600, the EGM receiving the group formation request 604, or the award redistribution server 116. After the group is formed, the group gaming session begins with each player member simultaneously playing 616 games of change, such as a slot or poker game, on a respective EGM 608. When player member earns 620 an award, such as a bonus, the player member's EGM 108 notifies 624 the award redistribution server 116 of the award event and amount of the award. In response, the award redistribution server 116 applies the award redistribution rules, determines an allocable redistributed award amount for each player member, and sends an award sharing message 628 to each of the player member's EGMs 608, or mobile devices 144.

Figure 7:
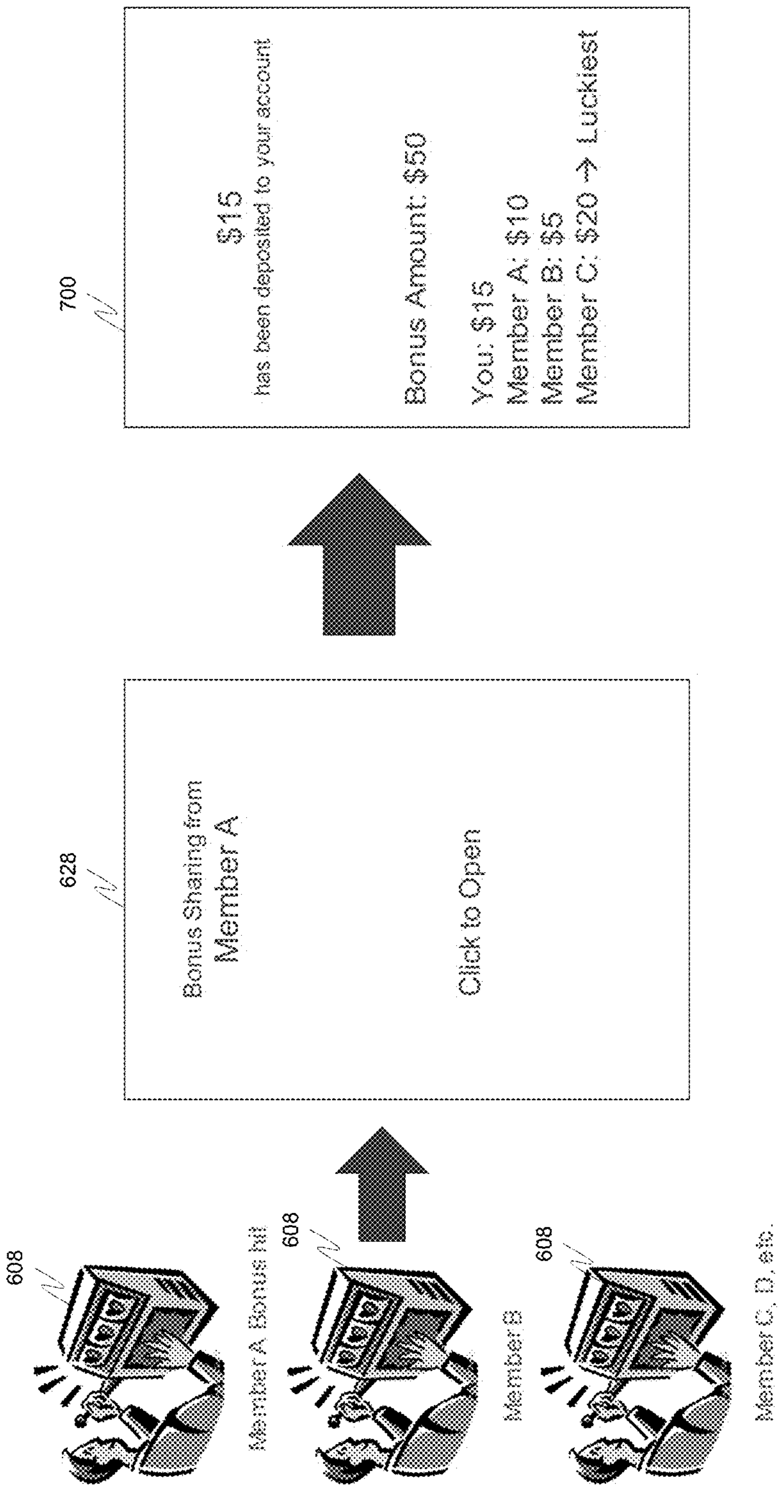
FIG. 7 is a block diagram depicting award redistribution notification messages in accordance with embodiments of the present disclosure.

As shown in FIGS. 6-7, the award sharing message 628, when opened 632 by the receiving player member 112 ("Member D"), notifies the receiving player member's EGM 608 or mobile device 144 or both that he or she has received a bonus sharing offer from the player member earning the award (shown as Member A) and provides a user selectable "Click to Open" field, which if selected causes a value of an electronic record of the receiving player member's available credit or wager credit account to be incremented by the allocable redistributed award share. In response to selecting the "Click to Open" field, the EGM or the mobile device 144 of the player member provides display 700 notifying the player member of an amount of the allocable redistributed award share that has been deposited into the player member's available credit or wager credit account, a total amount of the earned award, and the allocable redistributed amounts of the award given to the two other player members ("Member B" and "Member C"), including the player member ("Member A") earning the award. For casino carded player members, the newly deposited amount can be used for wagers in the group gaming session. If a player member 112, such as Member C, were not to claim his or her allocable redistributed award share, the unclaimed share would be redistributed 636 to Member A, Member B, and Member D in accordance with the award redistribution rules. In that event, Member A, Member B, and Member D would receive a further award sharing message 628 as described above.

The logic loops (as shown by loop 640) while the group gaming session is in progress and terminates when the group gaming session, or group, as the case may be, terminates in accordance with the group ending rules 482.

To increase player excitement, the bonus sharing message can be packaged as a treasure box or other object denoting a mysterious fortune. When a player member opens the object, the player member will see his or her redistributed bonus amount as well as the redistributed bonus amounts of other player members in the group.

In some applications, the bonus sharing message can be sent to player members that are carded by the casino and not to uncarded group members. In other words, only carded player members and not uncarded player members can share in a bonus hit.

In some applications, a cardless application can add bonus sharing and redistribution functions so that a player member can share and redistribute his or her bonus directly in the cardless application.

In some applications, the player members of the group play table games as part of a group gaming session. Each of the player members can share or redistribute his or her gaming awards from playing his or her corresponding table game after all of the player members have finished the gaming session, particularly if the games are played in a cashless way. In this manner, the player member's or group's credit or wager credit account can be decremented during play to reflect table game wagers, and the player member's available credit or wager credit account incremented at termination of the gaming session to reflect an amount of the allocable redistributed award share that has been deposited into the account.

Figure 8:
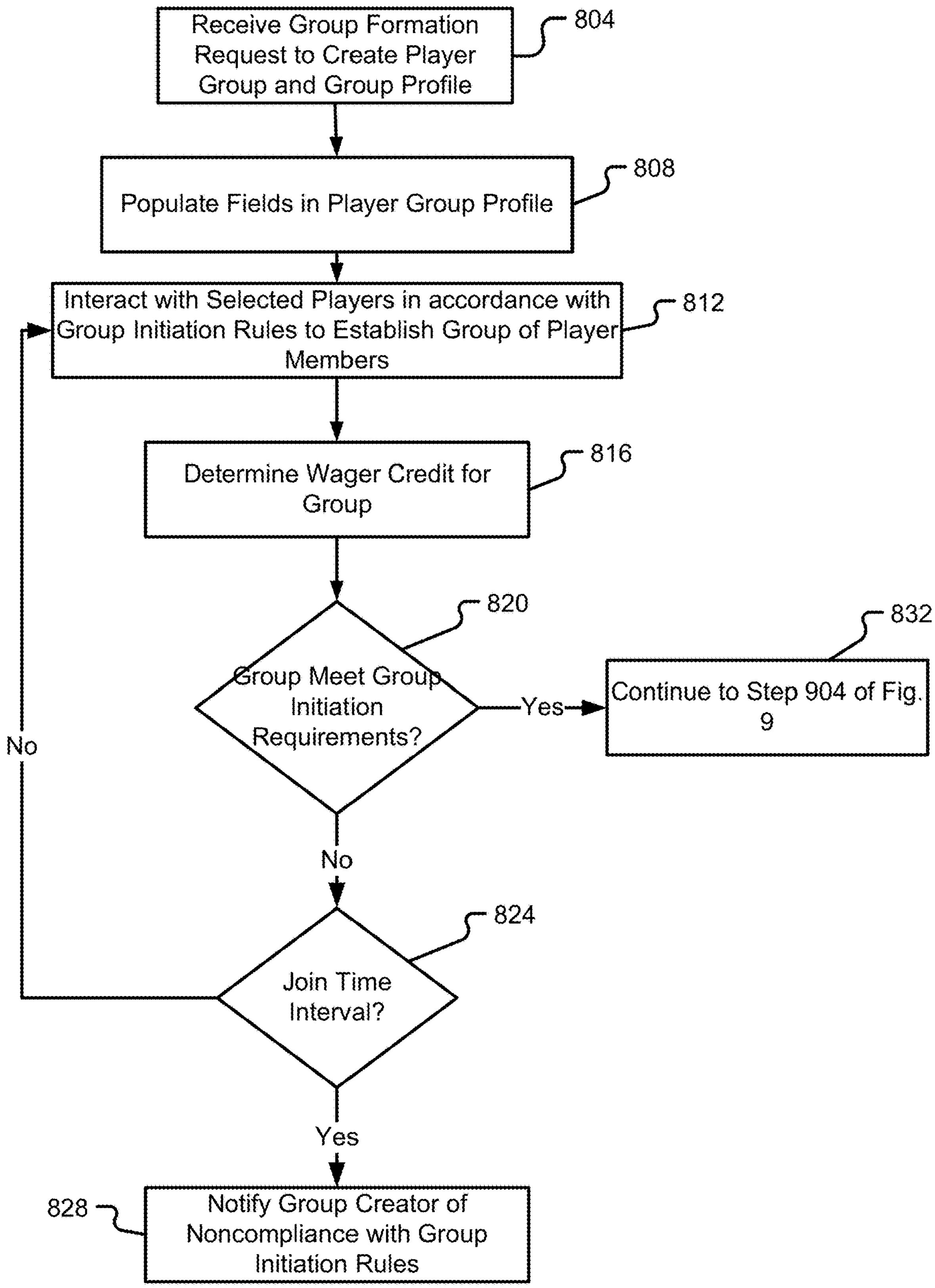
FIG. 8 is a flow diagram depicting a method of forming a group of players redistributing awards among group player members in the group in accordance with embodiments of the present disclosure.

With reference to FIG. 8, a method of forming a multiplayer group to play a group gaming session will be described in accordance with embodiments of the present disclosure. The method begins in step 804 when a player 112 initiates, at a gaming device 108 or mobile device 144, a group formation request, which causes execution of the group initiation instruction set 132 by the gaming device 108, mobile device 144, and/or award redistribution server 116.

The method continues by the gaming device 108 or mobile device 144 receiving player input to create a player group profile for the group to be created (step 808). This can require the player to provide information to populate the group information field 454, player member information field 458, group initiation rules field 462, award redistribution rules field 468, redistribution award claiming rules field 474, and group ending rules field 482.

The method continues by the award redistribution server 116 interacting, via the player invitee's gaming device 108 or mobile device 144, with the selected players to be in the group in accordance with the group initiation rules (step 812). This can include the player invitee's gaming device 108 or mobile device 144 receiving a join request to join the multi-player group. The join request can comprise an invitation code and agreement to the award redistribution rules, redistribution award claiming rules, and group ending rules. The player invitee can generate a join request by scanning a quick response ("QR") code on a mobile device 144 or service window, using location-based group creation (in which the player invitee's must be within a specified location or set of locations to join the group), using short code-based group creation, and/or synchronizing the group from a group chat facilitated by a chat application such as WhatsApp™ or WeChat™, for example.

The method continues by the award redistribution server 116 determining the wager credit for the group gaming session (step 816). The wagers for the player members used during the player members' games forming the gaming session can withdraw wagers from the group available credit or wager credit account.

The method continues by the award redistribution server 116 determining whether the group is in compliance with the group initiation rules (step 820). For instance, the award redistribution server 116 determines whether join requests have been received from the minimum number of player invitees to form the group and a minimum funding amount has been deposited in a group available credit or wager credit account that funds game wagers of the player members. When the group is in compliance with the group initiation rules, the award redistribution server 116 proceeds to step 904 of FIG. 9 (discussed below). When the group is not in compliance with the group initiation rules, the award processing server 116 proceeds to step 824.

The method continues in step 824 by the award redistribution server 116 determining whether a join time interval has expired. The join time interval is a value of the timer field 486 by which the group initiation rules must be satisfied for the group to be validly formed. When the join time interval has not yet expired, the award redistribution server returns and repeats step 812. When the join time interval has expired, the award redistribution server 116 proceeds to step 828 and notifies the gaming device 108 or mobile device 144 of the player acting as group creator of the fact and reason(s) of noncompliance with the group initiation rules.

Figure 9:
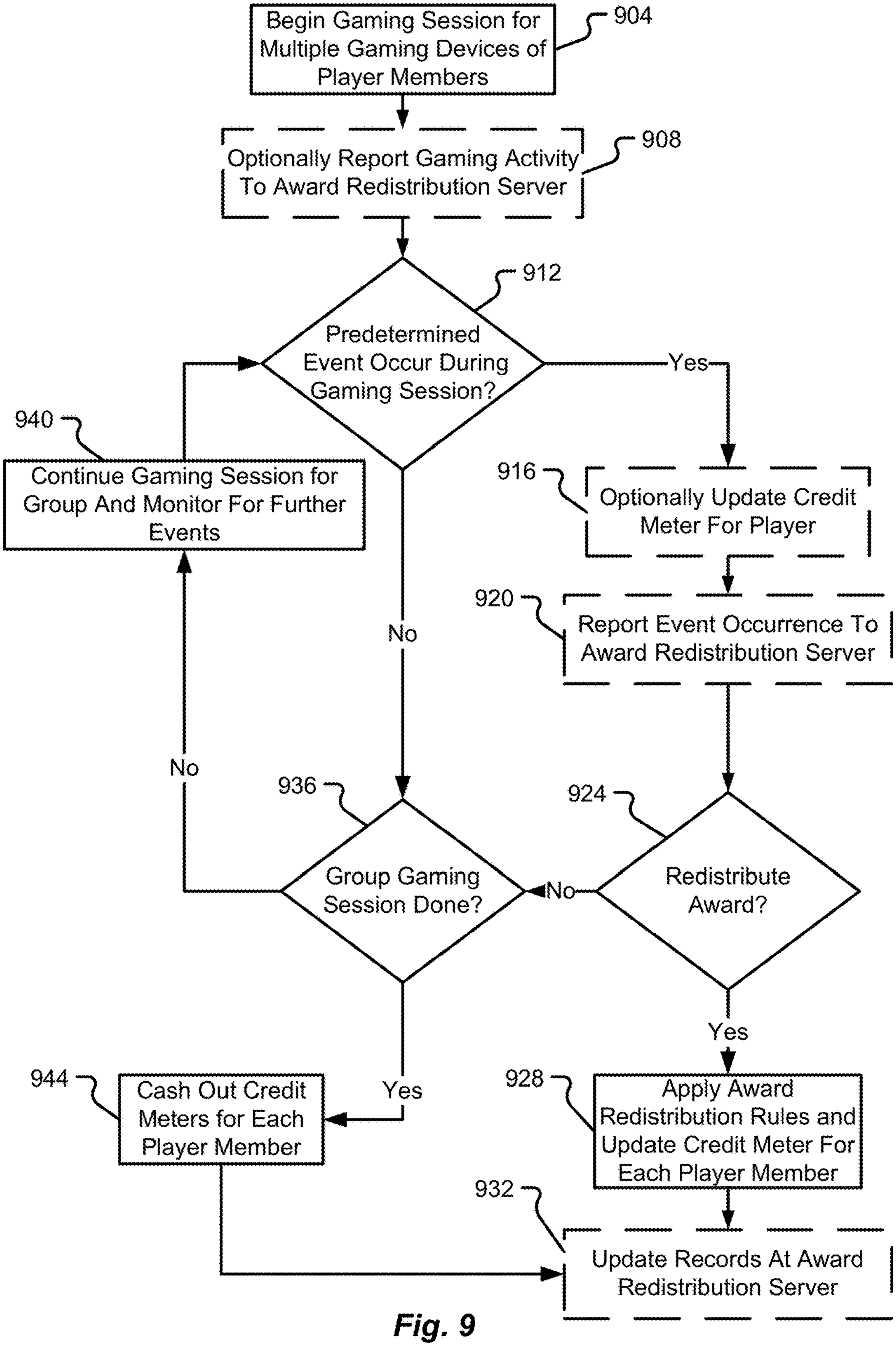
FIG. 9 is a flow diagram a method of redistributing awards among group player members in the group during a gaming session in accordance with embodiments of the present disclosure.

With reference now to FIG. 9, a method of redistributing awards during a group gaming session will be described in accordance with embodiments of the present disclosure. The method begins when a group gaming session at gaming machines 108 and/or mobile devices 144 is initiated by the player group members (step 904). Each of the player members plays a game at a respective gaming device 108 and/or mobile device 144 that is part of the gaming session. With the exception of award sharing, the games of each player member are independent of the games of the other player members.

The method may continue with the gaming or mobile device executing a game instruction set to enable the player member 112 to participate in a game of chance, a game of skill, or the like. The device may report gaming activity to the award redistribution server 116. The reported gaming activity can include game play information, such as player information 404 of the player member, wager credit information, and award information related to the player member's games in the gaming session.

The method continues by the gaming device 108 or mobile device 144 of each player member determining whether a predetermined event, such as a winning outcome, has occurred in a game during the gaming session (step 912). When a predetermined event has occurred, the respective gaming device 108 or mobile device 144 optionally updates an electronic record associated with an available credit or wager credit account of the corresponding player member 112 by a portion or all of the amount of the award (step 916).

The method continues by the gaming device 108 or mobile device 144 having the winning outcome optionally reporting the event occurrence to the award redistribution server 116 (step 920). The reported game play information can include the player information 404 of the player member and award information associated with the winning outcome. This step 920 may be in addition to or in lieu of step 908.

The method continues by the award redistribution server 116 determining whether to redistribute all or part of the award in accordance with the award redistribution rules (step 924). The award may not be eligible for redistribution, for example, when it falls below a minimum sharing amount, exceeds a maximum sharing amount, or falls within an award amount range that is not eligible for sharing with other player members. Stated differently, the award may only be available for sharing with other player members when it falls within a specified award range.

If the query of step 924 is answered negatively or if the predetermined event has not occurred (step 912), then the method may continue by determining whether or not the group gaming session is completed as defined by the group ending rules (step 936). For example, the group gaming session may terminate when a duration of the multi-player group or gaming session reaches a predetermined time, when a selected number of the player members have stopped playing games as part of the multi-player group, or when a predetermined amount of money is used by the player members of the multi-player group to play games on gaming machines. If the group gaming session is not completed, then the player member may be allowed to continue participating in the group gaming session and the player member activity may continue to be monitored for the occurrence of an event in a plurality of events (step 940). If the gaming session is completed, then the player member 112 may be cashed out by the gaming device, the electronic record associated with the available credit account on the gaming device may be appropriately updated, and the player profile database 148 may also be appropriately updated (step 944). In some embodiments, the electronic records in the player group database 152 maintained at the award redistribution server 116 may be appropriately updated (step 932).

Referring back to step 924, if it is determined that the award is to be redistributed and shared with other player members, the method may continue by applying award redistribution rules and updating an electronic record associated with an available credit or wager credit account of each player member based on the allocable share of the redistributed award to be received by that player member (step 928). The award redistribution server 116 can notify the gaming device 108 or mobile device 144 corresponding to each player member of the multi-player group of the share of the award associated with the winning outcome allocated to the respective player member. For instance, the notification can be sent to an account of the notified player member on a social networking website. The allocable shares of each player member can be the same or different depending on the implementation.

After step 928, the award redistribution server proceeds to step 932.

Figure 10:
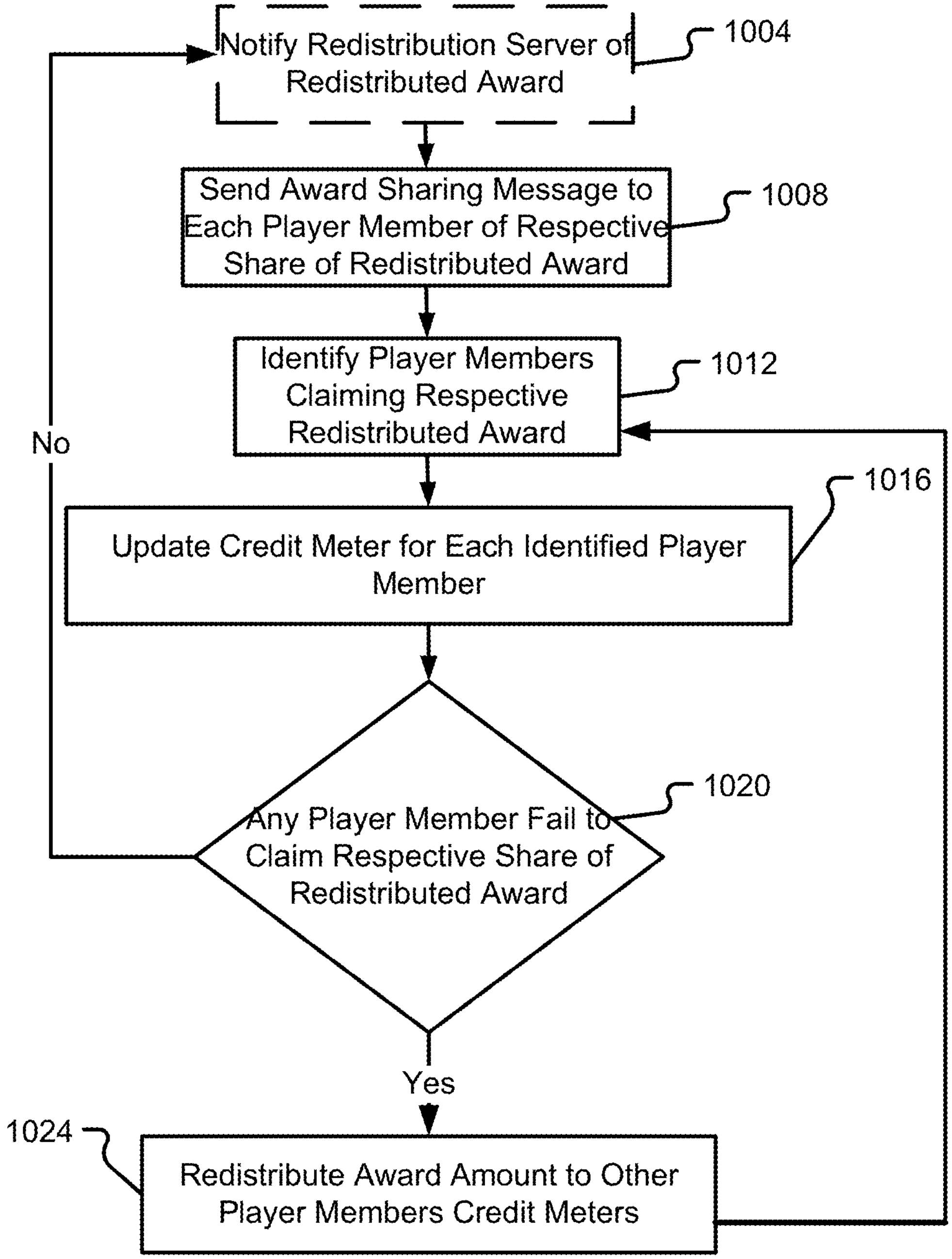
FIG. 10 is a flow diagram depicting a method of redistributing unclaimed awards among group player members in the group during a gaming session in accordance with embodiments of the present disclosure.

With reference now to FIG. 10, a method of redistributing awards during a group gaming session will be described in accordance with embodiments of the present disclosure. The method begins by notifying the award redistributed server of a redistributed award to be allocated among the various player members in the group arising from an winning outcome during a gaming session (step 1004).

The method continues by sending an award sharing message to each of the player members in the group setting forth the allocable share of the redistributed award to each player member (step 1008). Stated differently, each of the player members receives the same or different award sharing message, depending on how the award is redistributed among the player members.

The method continues by identifying player members claiming his or her respective share of the redistributed award (step 1012). Each player member can, for example, claim his or her respective share of the redistributed award by opening the award sharing message when the message is opened by the notified player member of the multi-player group within a predetermined time. In another example, the player member can claim his or her respective share of the redistributed award when an amount of money expended on gaming sessions on the gaming machines is at least a predetermined amount and cannot claim his or her respective share when an amount of money expended on gaming sessions on the gaming machines is less than at least a predetermined amount.

The method continues by updating an electronic account for each identified player member (step 1016). For example, the award redistribution server 116 can increment a value of an electronic record associated with an available credit or wager credit account of the player member to reflect an allocable share of the winning outcome.

The method continues by the award redistribution server determining whether any player member that has failed to claim his or her respective share of the redistributed award (step 1020). For example, the player member has not opened the award sharing message within the predetermined time. If no player member has failed to claim his or her respective share, the award redistribution server 116 returns to and repeats step 1004.

If one or more player members has failed to claim his or her respective share, the award redistribution server 116 redistributes an allocable share of the unclaimed share of the redistributed award (step 1024) by sending a new award sharing message to the other player members which can be claimed as indicated in steps 1012 and 1016. The relative share of the unclaimed share of the redistributed award can be redistributed among the other player members in a manner the same as or different from the originally allocated player member shares of redistributed award.

In some embodiments, the player member of the group can play each other in a common game or form a team to play against a casino.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

What is claimed is:

1. A method for sharing player awards in a gaming system, comprising:

receiving, by a processor of a gaming system and from a first player member, a group formation request to form a multi-player group to play a gaming session comprising multiple games to be played by the multi-player group on multiple electronic gaming machines, the group formation request comprising a number of potential player members to be invited to be in the multi-player group and a predetermined sequence of characters to be input by each invited potential player member and one of a predetermined rule set defining an allocation of a winning outcome among player members of the multi-player group and a duration of the multi-player group;

sending, via a network interface to the number of potential player members, a join request comprising an invitation to join the multi-player group;

receiving, by the processor of the gaming system and from a selected potential player member of the number of potential player members, a join request response to join the multi-player group, the join request response comprising a sequence of characters;

validating, by the processor of the gaming system, the join request response of the selected potential player member by confirming: that the sequence of characters in the join request response matches the predetermined sequence of characters and one of that a location of a user device corresponding to the selected potential player member is within a specified location, that the join request response was received within a selected period of time, that the join request response was sent by a selected communication modality, and that the join request response was received substantially synchronously with a group chat comprising the selected potential player member;

when the join request response of the selected potential player member is validated successfully, designating, by the processor of the gaming system, the selected potential player member as a player member of the multi-player group; and terminating, by the processor of the gaming system, the multi-player group upon occurrence of a predetermined event.

2. The method of claim 1, wherein join request response comprises an agreement by the selected potential player member to the predetermined rule set, wherein the predetermined event is expiration of a predetermined time, and wherein the multiple games are played substantially simultaneously by the player members of the multi-player group and further comprising:

receiving, by the network interface of the gaming system, game play information for a game in the gaming session;

determining, by the processor of the gaming system, that the game play information comprises a winning outcome corresponding to an award;

in response to the processor determining that the game play information comprises the winning outcome, allocating, by the processor of the gaming system, the winning outcome among the player members of the multi-player group;

notifying, by the network interface, a user device corresponding to each player member of the multi-player group of a share of the winning outcome allocated to the respective player member; and incrementing, by the processor of the gaming system, a value of an electronic record associated with an account of each of the player members of the multi-player group to reflect an allocable share of the winning outcome.

3. The method of claim 2, wherein the processor of the gaming system validates successfully each join request response of the number of potential player members, wherein the join request responses are received from a plurality of user devices comprising electronic gaming machines, wherein the multiple games comprise a slot game, wherein the winning outcome comprises a jackpot, and wherein one of the player members in the multi-player group plays a game in the gaming session independent of games in the gaming session played by other player members of the multi-player group.

4. The method of claim 3, wherein the winning outcome comprises a progressive jackpot, wherein different player members have different allocable shares, and further comprising:

initiating, by the processor of the gaming system, the allocating and notifying when a join request response is received from each of a number of player members of the multi-player group.

5. The method of claim 2, wherein the multiple games are played independently by the player members, wherein the user device comprises a gaming machine, wherein one of the player members in the multi-player group plays a game in the gaming session independent of games in the gaming session played by other player members of the multi-player group, wherein the winning outcome comprises a bonus, wherein the group formation request comprises an identity of each of the number of potential player members, and contact information for each of the number of potential player members or user devices of each of the number of potential player members, wherein the predetermined sequence of characters comprises a unique invitation code, the predetermined rule set defines requirements for group initiation, allocation of the winning outcome among player members of the multi-player group, and the duration of the multi-player group, wherein the join request comprises a request to agree to at least some of the predetermined rule set, wherein the designating comprises:

forming the multi-player group after the validating and upon confirming that the multi-player group satisfies a predetermined set of group initiation rules; and further comprising:

initiating, by the processor of the gaming system, the winning outcome allocating and gaming device notifying after termination of a join time interval determined by the processor of the gaming system, wherein an allocable share of each player member is determined pseudo-randomly on a winning outcome-by-winning outcome basis, wherein the winning outcome allocating and notifying the user device occur after termination of the gaming session, and wherein different player members have different allocable shares.

6. The method of claim 2, wherein one of the player members in the multi-player group plays a game independent of games played by other player members of the multi-player group, wherein the user device comprises a virtual gaming machine, and further comprising:

initiating, by the processor of the gaming system, the allocating and notifying after at least a predetermined amount of money is received by the gaming system to fund games played by the player members of the multi-player group; and when an award sharing message is opened by a player member of the multi-player group, incrementing, by the processor of the gaming system, a value of an electronic record associated with an account of the player member to reflect the player member's allocable share of the winning outcome, wherein each of the player members share equally in the winning outcome; and wherein the predetermined event occurs when an amount of money is used by the player members of the multi-player group to play games in the gaming session on virtual gaming machines or when a selected number of the player members have stopped playing games in the gaming session as part of the multi-player group.

7. The method of claim 6, wherein notifying the user device comprises sending the award sharing message to an account of a corresponding player member on a social networking website, wherein one of the player members in the multi-player group plays a game in the gaming session independent of games in the gaming session played by other player members of the multi-player group, wherein the user device comprises a video game gambling machine, wherein the game is video poker, and further comprising:

when an award sharing message is opened by a notified player member of the multi-player group within a predetermined time, incrementing, by the processor of the gaming system, a value of an electronic record associated with the account of the notified player member to reflect the corresponding player member's allocable share of the winning outcome; and when an award sharing message is not opened by the notified player member of the multi-player group within the predetermined time, incrementing, by the processor of the gaming system, a value of an electronic record associated with the account of a different player member to reflect at least a portion of the corresponding player member's allocable share of the winning outcome.

8. The method of claim 2, wherein the gaming system comprises multiple gaming machines, wherein a plurality of user devices comprises a portable communication device of a player member, wherein the predetermined sequence of characters comprises a group name, wherein one of the player members in the multi-player group plays in a different gaming session on different gaming machines, wherein notifying the user device comprises sending the award sharing message to the portable communication device of a corresponding player member, and further comprising:

when an amount of money expended on gaming sessions on the gaming machines is at least a predetermined amount, permitting, by the processor of the gaming system, each of the corresponding player members to withdraw the corresponding player member's allocable share of the winning outcome from an account of each of the corresponding player members; and when an amount of money expended on gaming sessions on the gaming machines is less than the at least a predetermined amount, not permitting, by the processor of the gaming system, each of the corresponding player members to withdraw the corresponding player member's allocable share of the winning outcome from the account of each of the corresponding player members; and wherein the predetermined event occurs when a predetermined amount of money is used by the player members of the multi-player group to play games on gaming machines.

9. An electronic gaming system comprising:

a communication interface;

a processor coupled with the communication interface; and a memory coupled with and readable by the processor and storing therein a set of instructions which, when executed by the processor causes the processor to:

receive, from a first player member, a group formation request to form a multi-player group to play a gaming session comprising multiple games to be played by the multi-player group on multiple electronic gaming machines, the group formation request comprising a number of potential player members to be invited to be in the multi-player group and a predetermined sequence of characters to be input by each of the invited potential player member and one of a predetermined rule set defining an allocation of a winning outcome among player members of the multi-player group and a duration of the multi-player group;

send, via the communication interface to the number of potential player members, a join request comprising an invitation to join the multi-player group;

receive, from a selected potential player member of the number of potential player members, a join request response to join the multi-player group, the join request response comprising the predetermined sequence of characters;

validate the join request response of the selected potential player member by confirming: that a sequence of characters in the join request response matches a predetermined sequence of characters and one of: that a location of a user device corresponding to the selected potential player member is within a specified location, that the join request response was received within a selected period of time, that the join request response was sent by a selected communication modality, and that the join request response was received substantially synchronously with a group chat comprising the selected potential player member; and when the join request response of the selected potential player member is validated successfully, designate the selected potential player member as a player member of the multi-player group.

10. The electronic gaming system of claim 9, wherein the processor terminates the multi-player group upon occurrence of a predetermined event, wherein the join request response comprises and agreement by the selected potential player member to the predetermined rule set, wherein the predetermined event is expiration of a predetermined time, and wherein the multiple games are played substantially simultaneously by the player members of the multi-player group and wherein the processor;

receives, by the communication interface, game play information for a game in the gaming session;

determines, by the communication interface, that the game play information comprises a winning outcome corresponding to an award;

in response to determining that the game play information comprises the winning outcome, allocates the winning outcome among the player members of the multi-player group;

notifies, by the communication interface, a user device corresponding to each player member of the multi-player group of a share of the winning outcome allocated to the respective player member;

increments a value of an electronic record associated with an account of each of the player members of the multi-player group to reflect an allocable share of the winning outcome; and terminates the multi-player group upon occurrence of a predetermined event.

11. The electronic gaming system of claim 10, wherein the processor validates successfully each join request response of the number of potential player members, wherein the join request responses are received from a plurality of user devices comprising electronic gaming machines, wherein the multiple games comprise a slot game, wherein the winning outcome comprises a jackpot, and wherein one of the player members in the multi-player group plays a game in the gaming session independent of games in the gaming session played by other player members of the multi-player group.

12. The electronic gaming system of claim 11, wherein the winning outcome comprises a progressive jackpot, wherein different player members have different allocable shares, and wherein the processor initiates the allocating and notifying operations when a join request response is received from each of a number of player members of the multi-player group.

13. The electronic gaming system of claim 10, wherein the multiple games are played independently by the player members, wherein the user device comprises a gaming machine, wherein one of the player members in the multi-player group plays a game in the gaming session independent of games in the gaming session played by other player members of the multi-player group, wherein the winning outcome comprises a bonus, wherein the group formation request comprises an identity of each of the number of potential player members, and contact information for each of the number of potential player members or user devices of each of the number of potential player members, wherein the sequence of characters comprises a unique invitation code, the predetermined rule set defines requirements for group initiation, allocation of the winning outcome among player members of the multi-player group, and the duration of the multi-player group, wherein the join request comprises a request to agree to at least some of the predetermined rule set, and wherein, in the designating operation, the processor forms the multi-player group after the validating operation and upon confirming that the multi-player group satisfies a predetermined set of group initiation rules; and wherein the processor initiates the winning outcome allocating and gaming device notifying after termination of a join time interval determined by the processor of the electronic gaming system, wherein an allocable share of each player member is determined pseudo-randomly on a winning outcome-by-winning outcome basis, wherein the winning outcome allocating and notifying the user device occur after termination of the gaming session, and wherein different player members have different allocable shares.

14. The electronic gaming system of claim 10, wherein one of the player members in the multi-player group plays a game independent of games played by other player members of the multi-player group, wherein the user device comprises a virtual gaming machine and wherein the processor:

Initiates the allocating and notifying operations after at least a predetermined amount of money is received by the electronic gaming system to fund games played by the player members of the multi-player group;

when an award sharing message is opened by a player member of the multi-player group, increments a value of an electronic record associated with an account of the player member to reflect the player member's allocable share of the winning outcome, wherein each of the player members share equally in the winning outcome; and terminates the multi-player group upon occurrence of a predetermined event.

15. The electronic gaming system of claim 14, wherein notifying the user device comprises sending the award sharing message to an account of a corresponding player member on a social networking website, wherein one of the player members in the multi-player group plays a game in the gaming session independent of games in the gaming session played by other player members of the multi-player group, wherein the user device comprises a video game gambling machine, wherein the game is video poker, and wherein the processor:

when an award sharing message is opened by a notified player member of the multi-player group within a predetermined time, increments a value of an electronic record associated with the account of the notified player member to reflect the corresponding player member's allocable share of the winning outcome;

when an award sharing message is not opened by the notified player member of the multi-player group within the predetermined time, increments a value of an electronic record associated with the account of a different player member to reflect at least a portion of the corresponding player member's allocable share of the winning outcome; and wherein the predetermined event occurs when an amount of money is used by the player members of the multi-player group to play games in the gaming session on virtual gaming machines or when a selected number of player members have stopped playing games in the gaming session as part of the multi-player group.

16. A gaming machine comprising:

a user interface;

a network interface;

a processor coupled with the user interface and network interface; and a memory coupled with and readable by the processor and storing therein a set of instructions which, when executed by the processor causes the processor to:

receive a group formation request from a player member to form a multi-player group comprising the player member, the group formation request comprising an invitation code to be input by each invited potential player member and one of: a number of player members invited to be in the multi-player group, a predetermined rule set defining, for a winning outcome, a winning outcome allocation among the player members of the multi-player group, and a duration of the multi-player group;

send, via the network interface to a gaming device associated with each of a plurality of potential player members for the multi-player group, a join request comprising an invitation to join the multi-player group;

receive, via the network interface, a plurality of join request responses;

validate each join request response by confirming for each join request: that a sequence of characters in the join request response matches the invitation code and one of: that a location of a corresponding gaming device is within a specified location, that the join request was received within a selected period of time, that the join request response was sent by a selected communication modality, and that the join request was received substantially synchronously with a group chat comprising the corresponding gaming device; and when the join request response of a selected potential player member is validated successfully, cause the user interface to notify the player member that the multi-player group has been formed.

17. The gaming machine of claim 16, wherein the processor:

while a game in a gaming session is played by the player member, receives, via the network interface, an award sharing message that a different player member in the multi-player group has won a winning outcome in a separate game in the gaming session and a share of the winning outcome allocated to an account of the player member, the player member's account being different from an account of the different player member;

in response to receipt of the award sharing message, causes the user interface to notify the player member that the player member has won the share of the winning outcome; and upon occurrence of a predetermined event, cause the user interface to notify the player member that the multi-player group has been terminated.

18. The gaming machine of claim 17, wherein the gaming machine comprises an electronic gaming machine, wherein the gaming session comprises a slot game, wherein the winning outcome comprises a jackpot, wherein the group formation request comprises a winning outcome range for sharing, wherein the winning outcome is not allocated to other player members when a magnitude of the winning outcome is outside of the winning outcome range for sharing, wherein the predetermined rule set comprises a rule defining a time duration of the multi-player group, and wherein the predetermined rule set comprises a rule requiring a winning outcome won by a player member in the multi-player group to be allocated equally among the player members in the multi-player group.

19. The gaming machine of claim 17, wherein the gaming machine comprises a video game gambling machine, wherein the gaming session comprises video poker, wherein the winning outcome comprises a cash winning outcome, wherein when a notification is not opened by a notified player member of the multi-player group within a predetermined time, the player member's allocable share of the winning outcome comprises other player member's allocable shares of the winning outcome, wherein the gaming session comprises multiple games played by player members in the multi-player group, wherein the games in the gaming session played by the player members in the multi-player group are independent of one another, and wherein the processor causes the user interface to notify the player member of a further portion of the winning outcome allocated to the player member due to a different player member failing to claim that player member's allocable share of the winning outcome.

20. The gaming machine of claim 16, wherein the gaming machine comprises a virtual gaming machine, wherein the winning outcome comprises a bonus, and wherein the predetermined rule set comprises a rule requiring a winning outcome won by a player member in the multi-player group to be allocated randomly among the player members in the multi-player group, and wherein the predetermined rule set comprises a rule defining a minimum amount of money to be spent collectively by the player members during the duration of the multi-player group before winning outcomes won by player members in the multi-player group to be allocated among the player members.

* * * * *